(12) United States Patent
Shah

(10) Patent No.: US 6,730,146 B2
(45) Date of Patent: May 4, 2004

(54) DRILLING FLUID DEGASSER

(75) Inventor: Dilipkumar P. Shah, Houston, TX (US)

(73) Assignee: Kem-Tron Technologies, Inc., Stafford, TX (US)

( * ) Notice: Subject to any disclaimer, the term of this patent is extended or adjusted under 35 U.S.C. 154(b) by 85 days.

(21) Appl. No.: 10/139,120

(22) Filed: May 3, 2002

(65) Prior Publication Data

US 2003/0205142 A1 Nov. 6, 2003

(51) Int. Cl.[7] ............................................... B01D 19/00
(52) U.S. Cl. .............................. 96/198; 96/200; 96/220
(58) Field of Search .................... 95/266, 262; 96/193, 96/197, 198, 200, 204, 206, 207, 215, 220

(56) References Cited

U.S. PATENT DOCUMENTS

| | | | | |
|---|---|---|---|---|
| 2,869,673 A | * | 1/1959 | Erwin | |
| 3,201,919 A | * | 8/1965 | Long | |
| 3,213,594 A | * | 10/1965 | Long | |
| 3,241,295 A | * | 3/1966 | Griffin, III et al. | |
| 3,325,974 A | * | 6/1967 | Griffin, III et al. | |
| 3,363,404 A | * | 1/1968 | Griffin, III et al. | |
| 3,481,113 A | * | 12/1969 | Burnham, Sr. | |
| 3,517,487 A | * | 6/1970 | Burnham, Sr. | |
| 3,555,819 A | * | 1/1971 | Burnham, Sr. | |
| 3,616,599 A | * | 11/1971 | Burnham, Sr. | |
| 3,676,984 A | * | 7/1972 | Clark | |
| RE27,882 E | * | 1/1974 | Burnham, Sr. | |
| 3,898,061 A | * | 8/1975 | Brunato | |
| 4,338,100 A | * | 7/1982 | Werosky et al. | |
| 4,668,251 A | | 5/1987 | Burgess | ........................ 55/190 |
| 4,872,530 A | | 10/1989 | Burgess | ...................... 184/6.12 |
| 4,957,187 A | | 9/1990 | Burgess | ...................... 184/6.12 |

* cited by examiner

*Primary Examiner*—Duane S Smith
(74) *Attorney, Agent, or Firm*—Jackie Lee Duke

(57) ABSTRACT

A drilling fluid degasser having a weir to more evenly spread the drilling fluid over the leaves of the degasser to increase the efficiency of the degasser is disclosed. Additionally, a plurality of gas vent pipes are provided that ensure that once the gases are removed from the drilling fluid, the gases are removed from the degasser without contacting the drilling fluid to ensure the gases are not mixed into the drilling fluid again.

18 Claims, 5 Drawing Sheets

DRILLING FLUID DEGASSER

BACKGROUND OF THE INVENTION

1. Field of the Invention

This invention relates to a drilling fluid degasser used in the oil and gas industry for the removal of associated gases that are released from the formation into the drilling fluid so that the drilling fluid may be recycled and reused in the drilling operations. More specifically, the present invention concerns a drilling fluid degasser using a vacuum chamber to which a vacuum pump is connected to produce a differential pressure between the vacuum chamber and the atmosphere.

The drilling of oil and gas wells utilizes a drill bit suspended a drill string that extends from the drilling rig to the bottom of the well bore being drilled. The drill string is an assembly of hollow pipes threaded together to form a continuous fluid conduit. During drilling operations, drilling fluid or "mud" as it is frequently referred to in the oil and gas industry is pumped down the drill string and out through ports in the drill bit. The drilling fluid is forced back up the annulus between the outside of the drill string and the well bore to the surface where it is processed for reuse. This overall system of mud processing is described in detail in U.S. Pat. No. 5,853,583 to Dilipkumar Shah, inventor of the present invention and assigned to the same assignee as this application.

An important aspect of the drilling fluid processing before reusing is the removal of entrained gases, such as methane and any other gases released from the formation including hydrogen sulfide, from the drilling fluid. The aforementioned pumping of the drilling fluid under pressure down the drill string is accomplished by duplex or triplex mud pumps having reciprocating pistons in cylinders for pressurizing the drilling fluid. If the entrained gas is air the efficiency of the pump is reduced. In the case of methane gas, if it is not removed by the degasser and disposed of properly, there is a danger of fire or explosion from the entrained methane gas.

Typical vacuum drilling fluid degassers use the differential pressure between the interior of the vacuum chamber and the outside atmosphere to cause gases to bubble up out of the drilling fluid where it drawn out of the degasser. The efficiency of this process is improved by allowing the drilling fluid to flow over leaves or conically shaped plates in the degasser in a thin film. This dispersion of the drilling fluid in a thin film over the leaves allows the bubbles entrained in the drilling fluid to more easily break loose from the drilling fluid, then burst and release their gas to the interior of the vacuum chamber where it drawn away by the vacuum pump. The removed gas is then routed to a safe distance from the rig and vented to the atmosphere or burned in a gas flare.

It is therefore important that the degasser function reliably and efficiently to remove the aforementioned entrained gases. The present invention accomplishes these goals in two respects. First a unique weir or gate is added to more evenly spread the drilling fluid over the leaves of the degasser to increase the efficiency of the degasser. Second a plurality of gas vent pipes are added to the degasser that ensure that once the gases are removed from the drilling fluid, the gases are removed from the degasser without contacting the drilling fluid to ensure the gases are not mixed into the drilling fluid again.

2. Description of Related Art

U.S. Pat. No. 4,668,251 to Harry L. Burgess shows a modified drilling mud degasser used to simultaneously degas drilling mud and supercharge a mud pump to which the degassed mud is delivered.

U.S. Pat. No. 4,872,530 to Harry L. Burgess discloses a self-lubricating centrifugal mud degasser.

U.S. Pat. No. 4,957,187 to Harry L. Burgess shows a gear-driven degasser for removing gases.

SUMMARY OF THE INVENTION

The present invention comprises a vacuum chamber having a cylindrical vessel with a hemispherical head or cap welded to each end to form the enclosed chamber. A vertically oriented drilling fluid inlet pipe is centrally located within the vacuum chamber. A plurality of fluid dispersion leaves are spaced vertically along the drilling fluid inlet pipe. The drilling fluid inlet pipe has a plurality of drilling fluid distribution outlets disposed circumferentially around the drilling fluid inlet pipe adjacent each of the fluid dispersion leaves at an elevation above the fluid dispersion leaves. The fluid dispersion leaves have a annular inner section sealingly secured to the drilling fluid inlet pipe and a conical outer section sealed to the annular inner section. The conical outer section extends radially outwardly to close proximity with the outer wall of the vacuum chamber. A fluid dispersion weir is disposed on each fluid dispersion leaf, encircling the plurality of circumferentially spaced drilling fluid distribution outlets. The fluid dispersion weir has a saw toothed upper edge to allow drilling fluid to pool behind the weir before spilling over the saw toothed edge in an even pattern. Additionally, each fluid dispersion leaf has a plurality of gas vents or stand pipes thereon to allow venting of gases extracted from the drilling fluid to pass upwardly through successive fluid dispersion leaves without contacting the drilling fluid.

A principal object of the present invention is to provide a drilling fluid degasser that uses a weir on the leaves to enhance even distribution of the drilling fluid over the leaves and thereby increase efficiency of the degasser.

A final object of the present invention is to provide a drilling fluid degasser that uses a unique system of gas vent pipes located on the leaves of the degasser to ensure gas removed from the drilling fluid is not remixed with the drilling fluid as it is evacuated from the degasser.

These with other objects and advantages of the present invention are pointed out with specificness in the claims annexed hereto and form a part of this disclosure. A full and complete understanding of the invention may be had by reference to the accompanying drawings and description of the preferred embodiments.

BRIEF DESCRIPTION OF THE DRAWINGS

These and other objects and advantages of the present invention are set forth below and further made clear by reference to the drawings, wherein.

DESCRIPTION OF THE PREFERRED EMBODIMENTS

Figure 1:
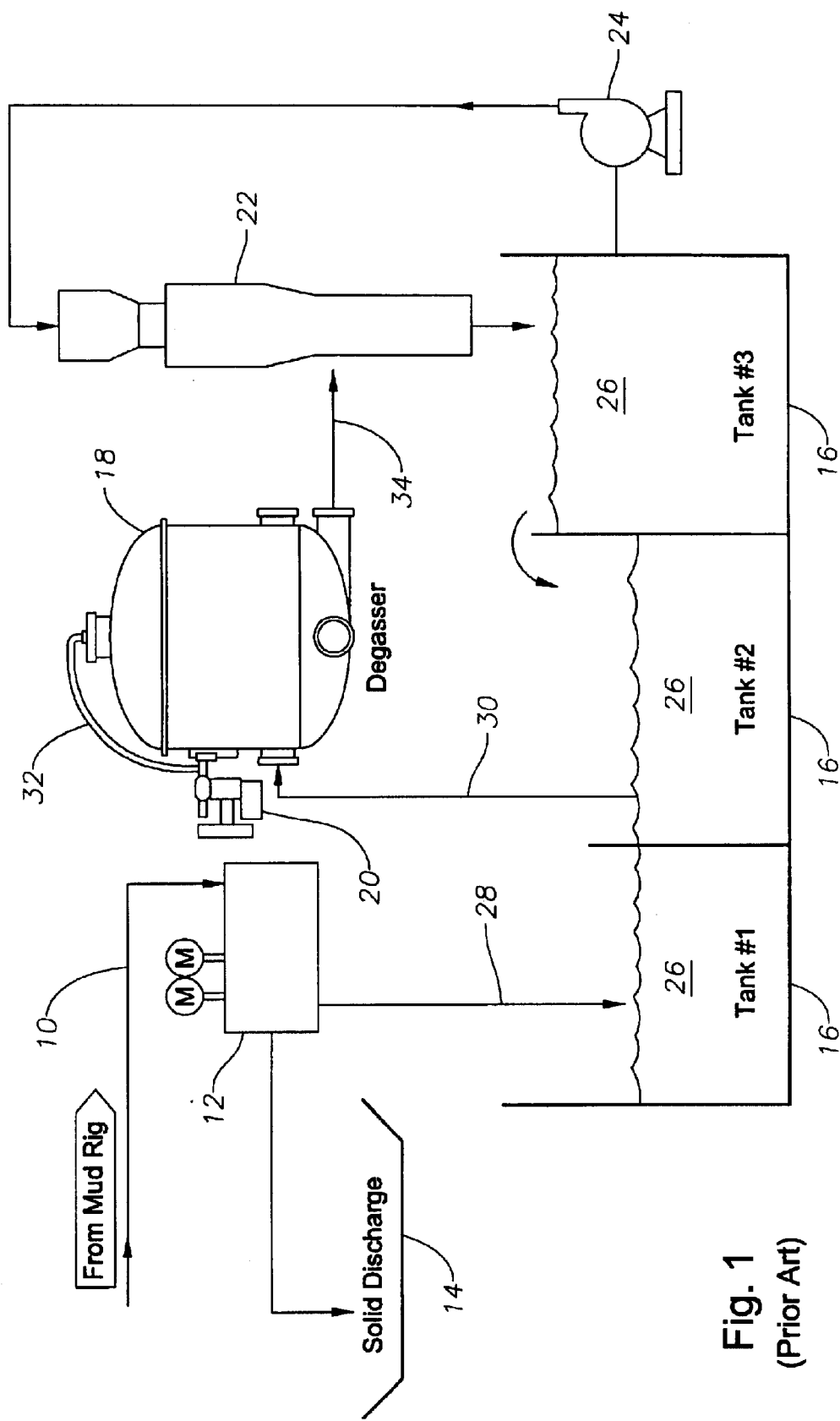
FIG. 1 is a diagrammatic view showing the flow of drilling fluid in relation to the drilling fluid degasser of the present invention.

With reference to the drawings, and particularly to FIG. 1, a flow diagram of a typical prior art drilling fluid processing system used in oil and gas drilling operations is shown. The main components include piping 10, shell shaker 12, holding tank 14, mud tanks 16, drilling fluid degasser 18, vacuum pump 20, eductor 22 and centrifugal pump 24. Assorted piping that will be described in greater detail hereinafter, complete the system. A typical sequence for processing drilling fluid or mud 26 begins with drilling fluid 26 returning from the well bore through piping 10 to shell shaker 12 where the solids are removed from drilling fluid 26 in a manner well known to those of ordinary skill in the art and discharged to holding tank 14. Drilling fluid 26 is then pumped through piping 28 to the first mud tank 16. As first mud tank 16 fills its overflow of drilling fluid 26 is to second mud tank 16. The drilling fluid 26 in second mud tank 16 typically will have gases such as air, carbon dioxide or methane dissolved in it and is referred to as "gas cut" mud in the industry. The gas cut mud or drilling fluid 26 is drawn into degasser 18 by the vacuum drawn on degasser 18 by vacuum pump 20 through piping 30. Entrained gases are removed from drilling fluid 26 and discharged through gas discharge line 32 and vacuum pump 20. The removed gases are then routed through piping (not shown) to a safe distance from the rig and vented to the atmosphere or burned in a gas flare. The degassed drilling fluid 26 is then discharges from the lower portion of degasser 18 through piping 34 to eductor 22 which then routes the degassed drilling fluid 26 to third mud tank 16 with the aid of centrifugal pump 24.

Figure 2:
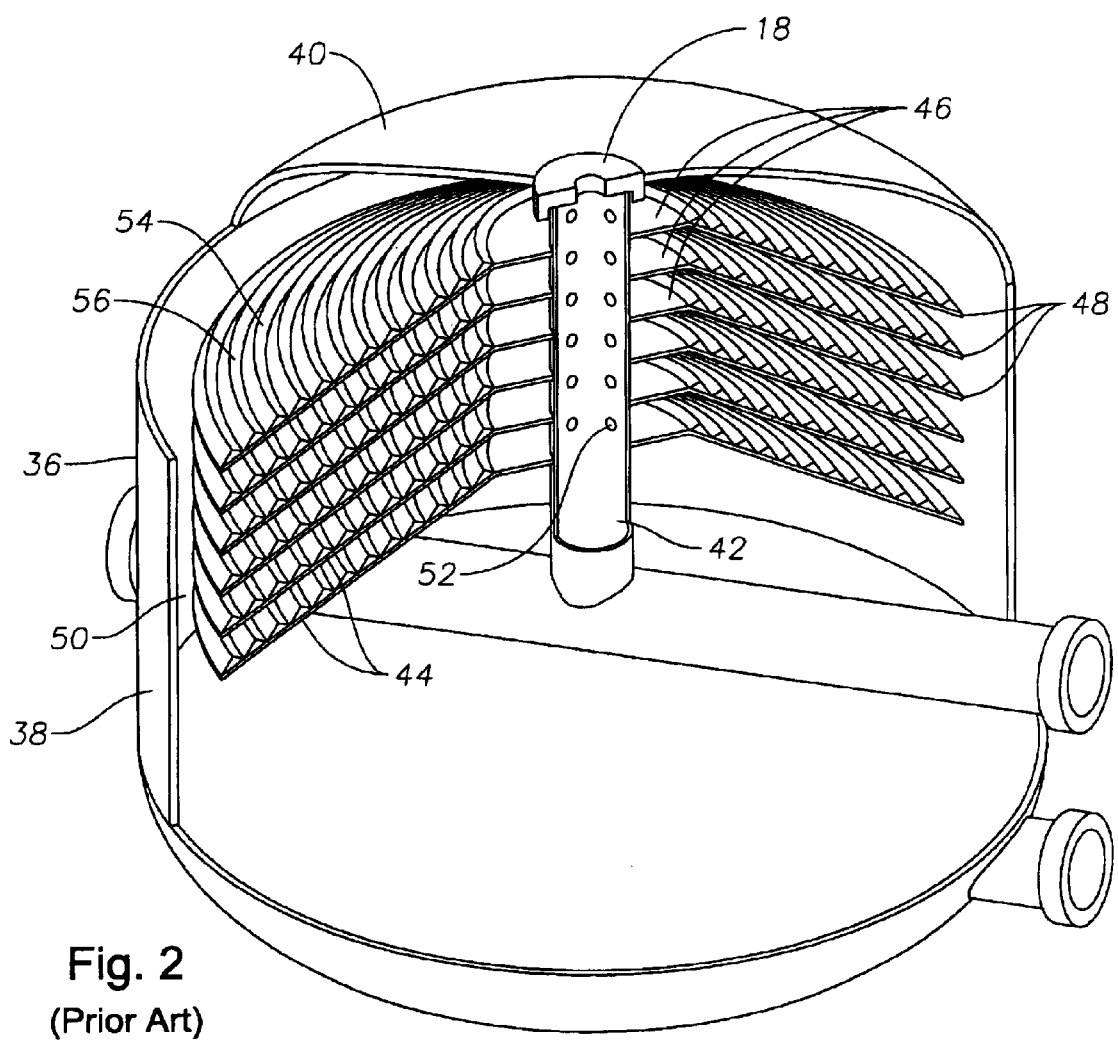
FIG. 2 is a perspective view showing the interior details of a prior art drilling fluid degasser.

Interior details of prior art drilling fluid degasser 18 are shown in FIG. 2. Degasser 18 includes a vacuum chamber 36 comprising a cylindrical outer wall 38 with hemispherical heads 40 secured at the top and bottom ends by suitable means as welding. Degasser 18 has drilling fluid inlet pipe 42 vertically disposed at its center. A plurality of fluid dispersion leaves 44 are axially disposed along drilling fluid inlet pipe 42 and sealingly secured thereto. Each fluid dispersion leaf 44 include a substantially horizontally disposed annular inner section 46 and a substantially conical outer section 48 sealed to inner section 46. Typically inner section 46 and conical outer section 48 are formed as a single unit from fiberglass although similarly suitable materials could be used. Conical outer section 48 extends radially outwardly and downward to close proximity with cylindrical outer wall 38 of vacuum chamber 36, leaving a gap 50 therebetween.

Adjacent each fluid dispersion leaf 44 are a plurality of fluid distribution outlets 52 that allow drilling fluid 26 drawn up into drilling fluid inlet pipe 42 to flow outwardly across fluid dispersion leaves 44 as previously described. Upper surface 54 of fluid dispersion leaves 44 includes ridges or corrugations 56 thereon to slow the flow of drilling Drilling fluid 26 continues to flow downwardly across fluid dispersion leaves 44 releasing gas bubbles as previously described. Once drilling fluid 26 reaches the edge of fluid dispersion leaves 44 it flow through gap 50 to the bottom of degasser 18 where it is removed. The upper end of degasser 18 includes port 58 that is connected to vacuum pump 20 for removal of gas bubbles.

Figure 3:
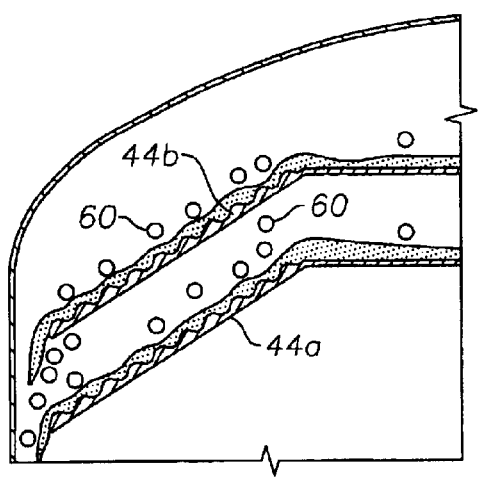
FIG. 3 is a sectional view showing the details of the gas removal in a prior art drilling fluid degasser.

The flow of gas bubbles within degasser 18 is best illustrated in FIG. 3 where a section of a pair of fluid dispersion leaves 44 are shown. As drilling fluid 26 flows over lower dispersion leaf 44a, gas molecules 60 are seen rising from drilling fluid 26 to the bottom of upper dispersion leaf 44b. Due to the vacuum applied to degasser 18, gas molecules 60 are then drawn around the end of upper dispersion leaf 44b, through gap 50 and out port 58. The problem with such prior art devices is gas molecules 60 having to flow around and through drilling fluid 26 that is falling from the fluid dispersion leaves 44 above. This causes a certain amount of remixing of gas molecules 60 with drilling fluid 26 and thereby lowering the efficiency of degasser 18. Additionally, if the vacuum is removed, the natural tendency of the gases released from the drilling fluid is to migrate to the underside of upper dispersion leaf 44b and upwardly back toward drilling fluid inlet pipe 42 where the gases can stagnate. This is especially hazardous in the case of explosive gases such as methane. Therefore there exists a need for a degasser that minimizes this type of remixing or recontamination of drilling fluid 26 and the possibility of gases stagnating around drilling fluid inlet pipe 42.

Figure 4:
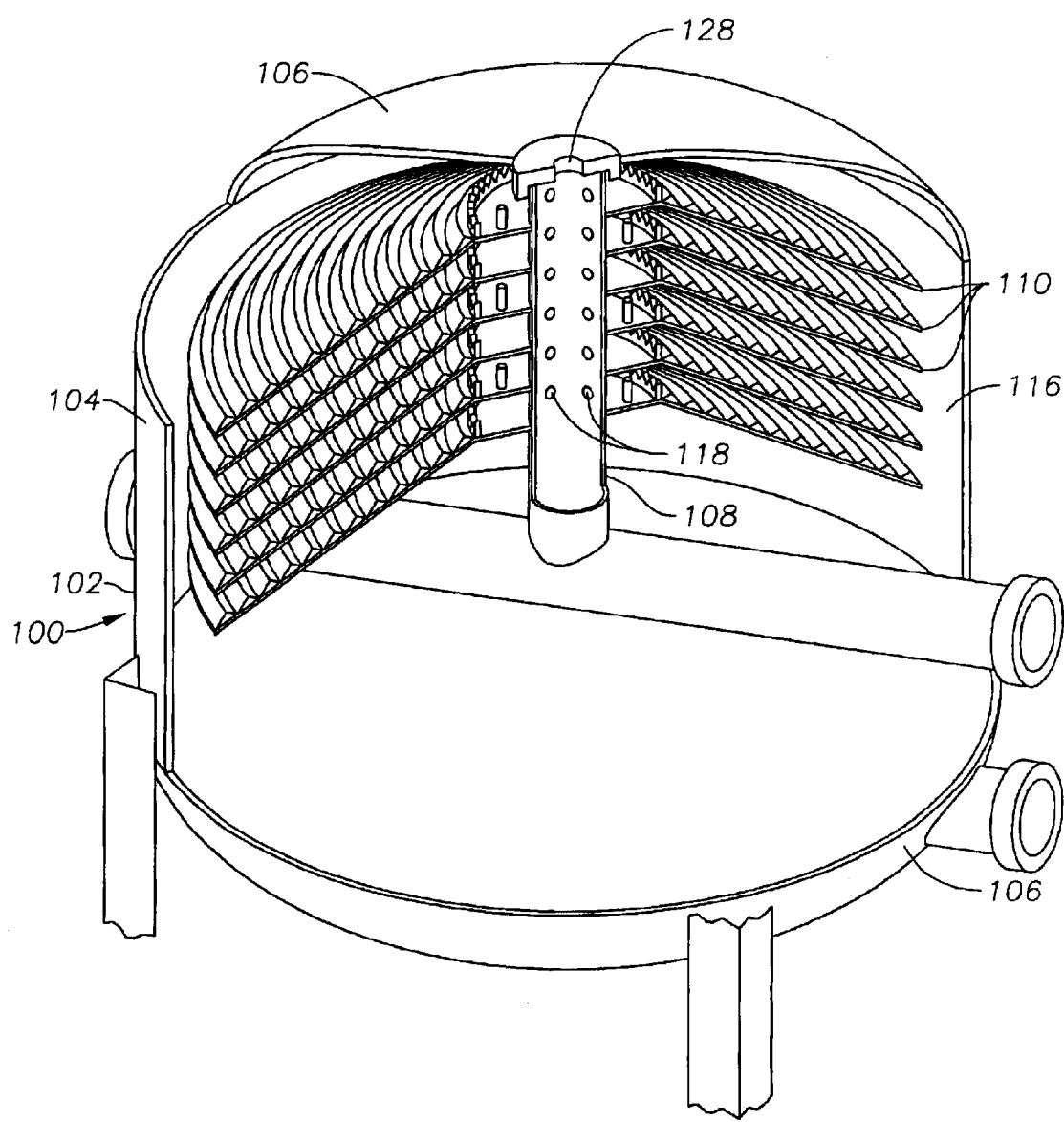
FIG. 4 is a perspective view, partly in section, showing the interior details of the drilling fluid degasser of the present invention.
Figure 5:
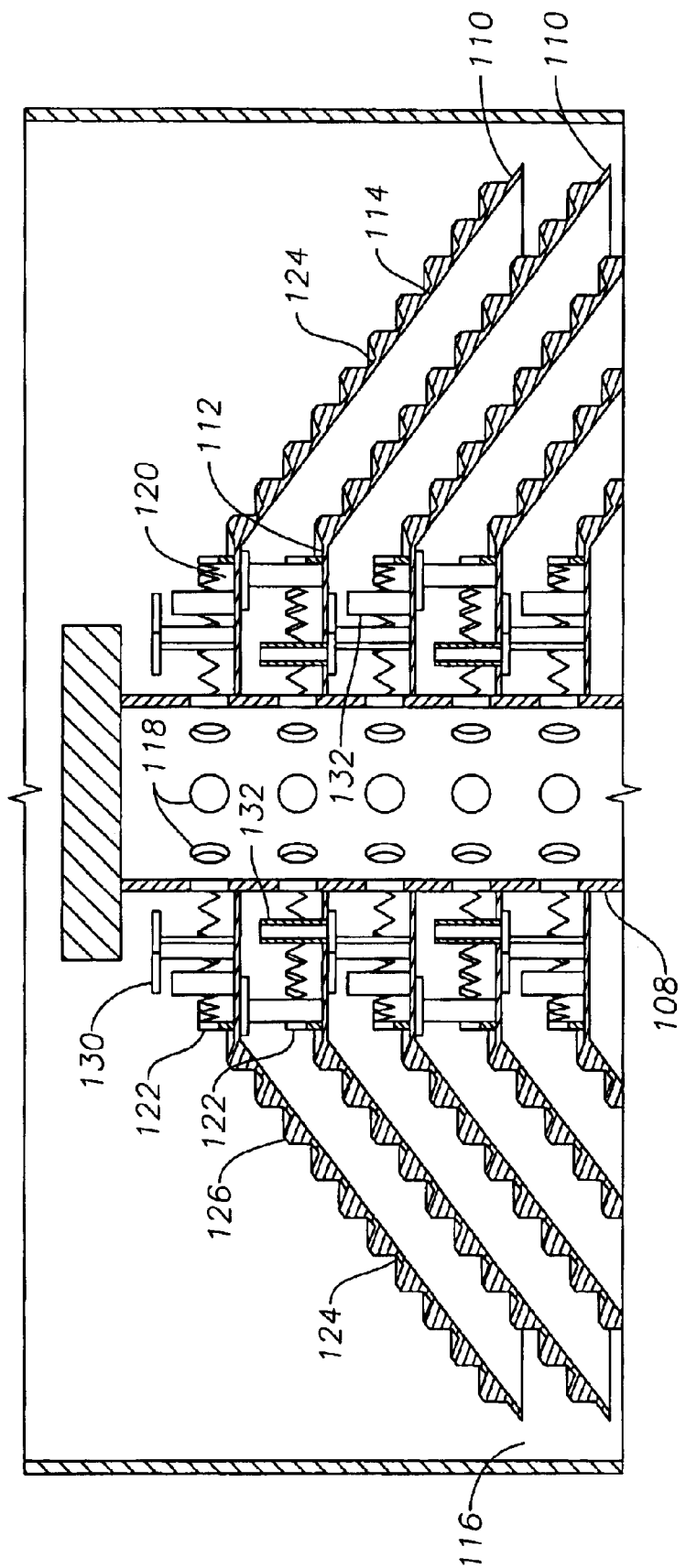
FIG. 5 is a perspective view, partly in section, showing the interior details of the weir and gas venting of the drilling fluid degasser of the present invention.

Drilling fluid degasser 100 of the present invention is shown in FIGS. 4 and 5. Degasser 100 includes a vacuum chamber 102 comprising a cylindrical outer wall 104 with hemispherical heads 106 secured at the top and bottom ends by suitable means as welding. Degasser 100 has drilling fluid inlet pipe 108 vertically disposed at its center. A plurality of fluid dispersion leaves 110 are axially disposed along drilling fluid inlet pipe 108 and sealingly secured thereto. Each fluid dispersion leaf 110 include a substantially horizontally disposed annular inner section 112 and a substantially conical outer section 114 integrally formed with inner section 112. Fluid dispersion leaf 110 is formed from fiberglass although similarly suitable materials could be used. Conical outer section 114 extends radially outwardly and downward to close proximity with cylindrical outer wall 104 of vacuum chamber 102, leaving a gap 116 therebetween.

Adjacent each fluid dispersion leaf 110 are a plurality of fluid distribution outlets 118 that allow drilling fluid 26 drawn up into drilling fluid inlet pipe 108 to flow outwardly. Adjacent each set of fluid distribution outlets 118, positioned on substantially horizontally disposed annular inner section 112 is weir 120, encircling circumferentially spaced fluid distribution outlets 118. Weir 120 has a corrugated upper surface 122 in the form of a saw tooth. Wier 120 acts as a gate or damn to retain drilling fluid 26 flowing from fluid distribution outlets 118 on annular inner section 112 until a desired depth is reached and drilling fluid 26 can then flow over conical outer section 114 of fluid dispersion leaf 110 in an evenly distributed pattern that increases the distribution of drilling fluid 26 over leaf 110. This is in contrast to the flow pattern of the prior art degasser 18 in which drilling fluid 26 flows directly from outlets 52 onto leaves 44 in a limited fan shaped pattern. Although weir 120 is shown with a saw tooth shaped upper surface other corrugated patterns could be used without departing from the scope of the present invention.

Upper surface 124 of fluid dispersion leaves 110 includes ridges or corrugations 126 thereon to slow the flow of drilling fluid 26. Drilling fluid 26 continues to flow downwardly across fluid dispersion leaves 110 releasing gas bubbles as previously described. Once drilling fluid 26 reaches the edge of fluid dispersion leaves 110 it flows through gap 116 to the bottom of degasser 100 where it is removed. The upper end of degasser 100 includes port 128 that is connected to vacuum pump 20 for removal of gas bubbles. Annular inner section 112 of fluid dispersion leaves 110 includes stanchions 130 that aid in supporting leaves 110.

Figure 6:
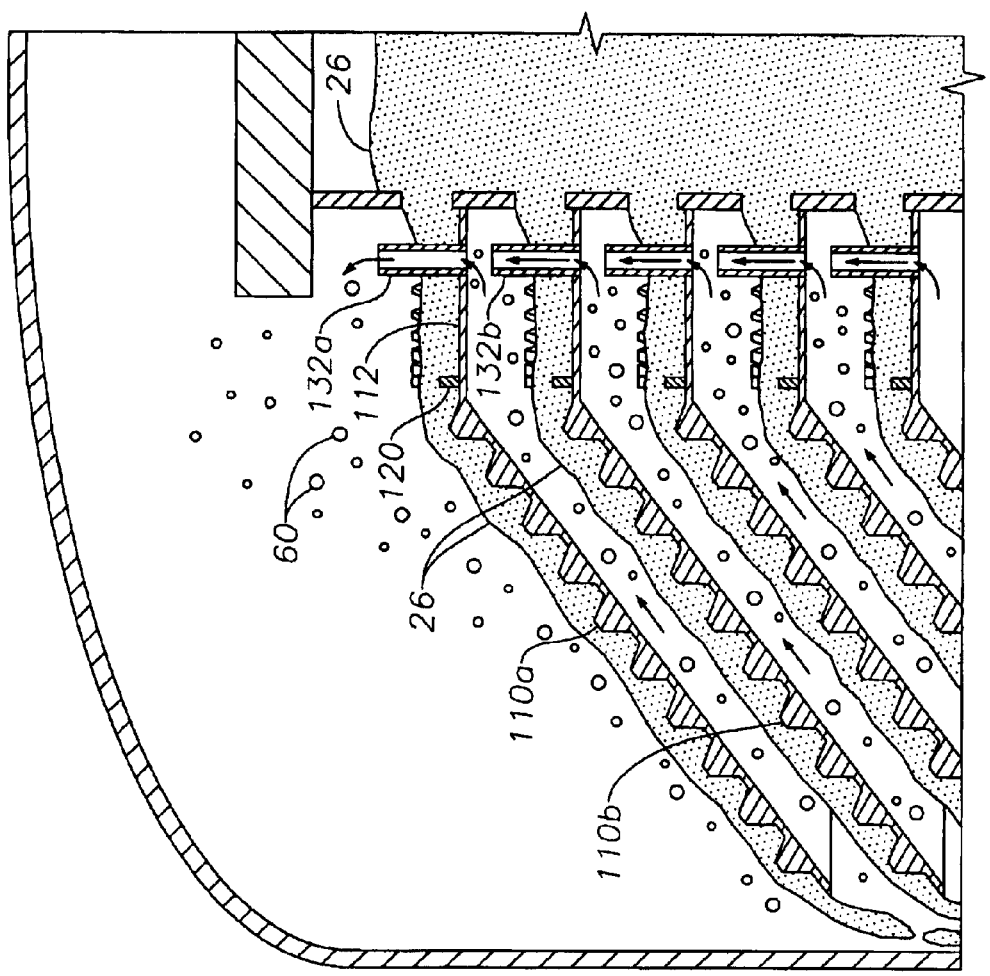
FIG. 6 is a sectional view showing the details of the gas removal in the drilling fluid degasser of the present invention.

Circumferentially disposed around inner section 112 are standpipes or gas vent passageways 132. Typically standpipes 132 will be sized to extend above the level of drilling fluid 26 that will accumulate behind weir 120 before it spills onto fluid dispersion leaves 110. Additionally, each set of standpipes 132 on a given leaf 110 are offset circumferentially from the standpipes 132 on adjacent leaves 110. Although shown in an offset configuration, standpipes 132 could be arranged inline between adjacent leaves 110 without departing from the scope of the present invention. The reason for this arrangement is shown in FIG. 6 where a section of a pair of fluid dispersion leaves 110a and 110b are shown. As drilling fluid 26 flows under lower dispersion leaf 110b, gas molecules 60 are seen rising from drilling fluid 26 to the bottom of lower dispersion leaf 110b as in the prior art degasser. Due to standpipes 132a and 132b being placed on inner section 112 and the vacuum applied to degasser 100, gas molecules 60 are drawn along the underside of lower dispersion leaf 110b to standpipe 132b. This arrangement provides a path for gas molecules 60 to be drawn up through successive leaves and standpipes, such as 132a, without having to cross the path of drilling fluid 26 flowing in gap 116. Since standpipes 132 are circumferentially spaced, gas molecules 60 can flow upwardly without interruption. Therefore degasser 100 provides a structure which allows gas molecules to be drawn from drilling fluid 26 without remixing. Additionally, if centrifugal pump 24 fails and vacuum to the degasser is lost, the natural migration of the released gases is toward drilling fluid inlet pipe 108 as noted above and therefore venting of gases through standpipes 132 will continue and prevent stagnation of gases around drilling fluid inlet pipe 108.

The construction of my drilling fluid degasser will be readily understood from the foregoing description and it will be seen that I have provided a drilling fluid degasser having a weir to more evenly spread the drilling fluid over the leaves of the degasser to increase the efficiency of the degasser and a plurality of gas vent pipes are provided that ensure that once the gases are removed from the drilling fluid, the gases are removed from the degasser without contacting the drilling fluid to ensure the gases are not mixed into the drilling fluid again. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A drilling fluid degasser, comprising:
    a vacuum chamber;
    a drilling fluid inlet pipe disposed within said vacuum chamber;
    a plurality of fluid dispersion leaves spaced along said drilling fluid inlet pipe;
    a plurality of drilling fluid distribution outlets disposed circumferentially around said drilling fluid inlet pipe adjacent each of said fluid dispersion leaves, and at an elevation above said fluid dispersion leaves; and,
    a fluid dispersion weir disposed on each of said fluid dispersion leaves, said fluid dispersion weir encircling said plurality of circumferentially spaced drilling fluid distribution outlets.

2. A drilling fluid degasser according to claim 1, wherein each of said fluid dispersion leaves includes:
    a substantially horizontally disposed annular inner section sealingly secured to said drilling fluid inlet pipe; and,
    a substantially conical outer section sealed to said annular inner section, said conical outer section extending radially outwardly to close proximity with the outer wall of said vacuum chamber.

3. A drilling fluid degasser according to claim 2, wherein:
    said fluid dispersion weir retaining drilling fluid discharged from said plurality of drilling fluid distribution outlets until a desired depth is reached before said drilling fluid may flow over said fluid dispersion weir.

4. A drilling fluid degasser according to claim 3, wherein:
    said fluid dispersion weir disposed on each of said fluid dispersion leaves is disposed on said substantially horizontally disposed annular inner section of said fluid dispersion leaves.

5. A drilling fluid degasser according to claim 4, wherein:
    said fluid dispersion weir has a corrugated upper surface.

6. A drilling fluid degasser according to claim 5, wherein:
    said corrugated upper surface of said fluid dispersion weir is a saw tooth.

7. A drilling fluid degasser according to claim 5, including:
    a plurality of gas vent passageways disposed on each of said horizontally disposed annular inner sections of said fluid dispersion leaves; and,
    said plurality of said gas vent passageways allowing venting of gases extracted from said drilling fluid to pass upwardly through successive fluid dispersion leaves without contacting said drilling fluid.

8. A drilling fluid degasser according to claim 7, wherein:
    said conical outer section has a corrugated surface.

9. A drilling fluid degasser according to claim 8, including:
    an eductor connected to said vacuum chamber to take gas free drilling fluid from said drilling fluid degasser and return said gas free drilling fluid to the mud system.

10. A drilling fluid degasser, comprising:
    a vacuum chamber;
    a drilling fluid inlet pipe disposed within said vacuum chamber;
    a plurality of fluid dispersion leaves spaced along said drilling fluid inlet pipe;
    a plurality of drilling fluid distribution outlets disposed circumferentially around said drilling fluid inlet pipe adjacent each of said fluid dispersion leaves, and at an elevation above said fluid dispersion leaves;
    a plurality of gas vent passageways disposed on each of said fluid dispersion leaves; and,
    said plurality of said gas vent passageways allowing venting of gases extracted from said drilling fluid to pass upwardly through successive fluid dispersion leaves without contacting said drilling fluid.

11. A drilling fluid degasser according to claim 10, wherein each of said fluid dispersion leaves includes:
    a substantially horizontally disposed annular inner section sealingly secured to said drilling fluid inlet pipe; and,
    a substantially conical outer section sealed to said annular inner section, said conical outer section extending radially outwardly to close proximity with the outer wall of said vacuum chamber.

12. A drilling fluid degasser according to claim 11, including:
   a fluid dispersion weir disposed on each of said fluid dispersion leaves, said fluid dispersion weir encircling said plurality of circumferentially spaced drilling fluid distribution outlets.

13. A drilling fluid degasser according to claim 12, wherein:
   said fluid dispersion weir retaining drilling fluid discharged from said plurality of drilling fluid distribution outlets until a desired depth is reached before said drilling fluid may flow over said fluid dispersion weir.

14. A drilling fluid degasser according to claim 13, wherein:
   said fluid dispersion weir disposed on each of said fluid dispersion leaves is disposed on said substantially horizontally disposed annular inner section of said fluid dispersion leaves.

15. A drilling fluid degasser according to claim 14, wherein:
   said fluid dispersion weir has a corrugated upper surface.

16. A drilling fluid degasser according to claim 15, wherein:
   said corrugated upper surface of said fluid dispersion weir is a saw tooth.

17. A drilling fluid degasser according to claim 16, wherein:
   said conical outer section has a corrugated surface.

18. A drilling fluid degasser according to claim 17, including:
   an eductor connected to said vacuum chamber to take gas free drilling fluid from said drilling fluid degasser and return said gas free drilling fluid to the mud system.

* * * * *